Figure 1:
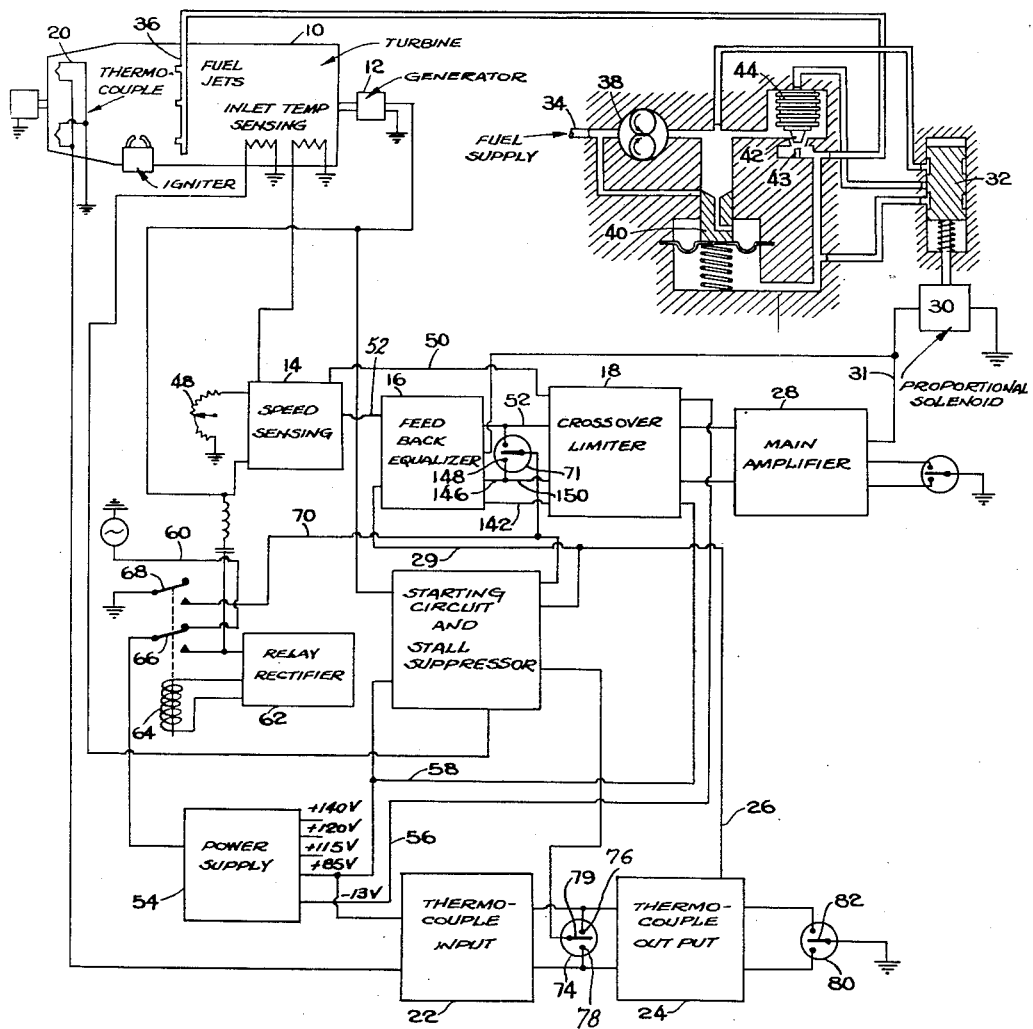

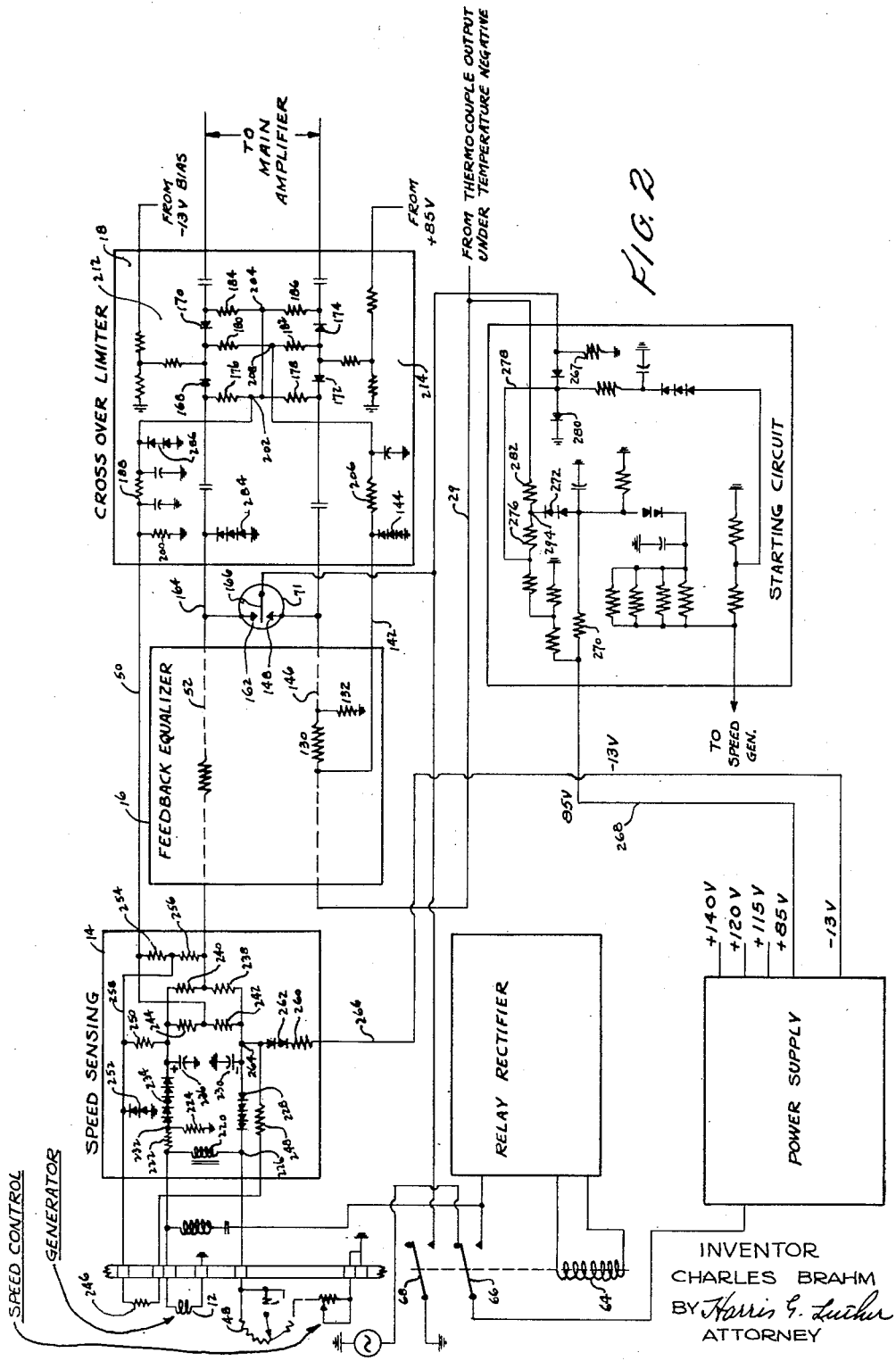

United States Patent Office 2,771,742
Patented Nov. 27, 1956

2,771,742

SAFETY CIRCUIT FOR GENERATOR UNIT OF THE JET FUEL CONTROL

Charles B. Brahm, Windsor Locks, Conn., assignor to United Aircraft Corporation, East Hartford, Conn., a corporation of Delaware Application December 6, 1952, Serial No. 324,548

18 Claims. (Cl. 60—39.09)

This invention relates to fuel control mechanism and particularly to safety means for continuing operation of said control after failure of one of its component parts.

An object of the invention is to provide a safety control signal upon failure of normal signal providing mechanism.

A further object is to provide an underspeed signal upon failure of the speed signal source.

A still further object is mechanism which will permit control by temperature responsive mechanism upon failure of the speed signal source.

A still further object is mechanism which will permit an increase of fuel flow for undertemperature conditions when the speed responsive signal is disabled.

Still another object is the provision of means, in a fuel control that normally controls fuel flow in response to speed and temperature, for controlling fuel flow in response to temperature alone upon failure of the speed signal source.

Additional objects and advantages will be apparent from the attached specification, claims and drawings in which, Fig. 1 is a schematic and block diagram showing the general arrangement of the turbine, the fuel supply and the electronic control for the fuel supply.

Fig. 2 shows the speed sensing circuit crossover limiter schematically in more detail than Fig. 1 including the wiring diagrams therefor.

Referring to the drawings and particularly to Fig. 1, the turbine jet engine 10 may be of any well known type such as the type utilizing a compressor receiving air from an air inlet and delivering the air under pressure to a combustion chamber where fuel is burned. The products of combustion from the combustion chamber are fed to a gas turbine which drives the compressor. Gas exhausted from the turbine passes out through a tailpipe. The compressor may be either centrifugal or axial flow type and the turbine may be either a power jet type or a portion of the turbine power may be utilized to drive a propeller giving a combination known as a turboprop.

During operation of the turbo-jet type in particular, the fuel is selectively controlled by a speed or a temperature sensitive control system. A speed is selected by the pilot on a speed control 48 which will select a datum for the speed sensitive control system. The signal from the speed sensitive control system is compared with a signal from the temperature sensitive control system in the crossover limiter and the resultant signal is used to position the pilot valve controlling the flow of fuel to the turbine. Thus control of the throttle is effected by movement of the speed control lever 48.

This control is electronic in nature and in general is similar to that shown in Offner application Serial No. 84,696, filed March 31, 1949, now Patent No. 2,697,908, entitled System of Engine Speed Control. As shown in Fig. 1, of the present application, a speed signal is taken from a generator 12, which may be an alternating current generator driven by the turbine, and is fed to a speed sensing circuit 14. In the speed sensing circuit, a speed error voltage is produced. This error voltage may be zero when the turbine is onspeed, positive when the turbine is overspeed, and negative when the turbine is underspeed. The speed error signal is fed to crossover limiter 18.

A temperature signal is fed from tailpipe thermocouples 20 to thermocouple input circuit 22 where it is compared with a fixed voltage and transformed into a temperature error signal. The temperature error signal is amplified in the thermocouple output circuit 24 and fed through line 26 to feedback equalizer 16 and crossover limiter 18. The amplified temperature error signal is zero or null when ontemperature, positive when the turbine is overtemperature and negative when the turbine is undertemperature. In the crossover limiter 18, the most positive or least negative signal of the speed and temperature signals is selected to be transmitted to the main amplifier 28 where it is amplified and then fed to the proportional solenoid 30 through the line 31.

The proportional solenoid is of a type shown in Patent No. 2,579,723, issued December 25, 1951, to S. G. Best for Magnetic Device, to which reference may be made for a more detailed explanation. The proportional solenoid 30, which is normally centered but may be moved in one direction with a negative signal and in the opposite direction with a positive signal, operates a valve 32 controlling the flow of fuel from the fuel supply 34 to the fuel jets 36. This fuel supply system is of the type shown in application Serial No. 231,926, filed June 16, 1951, by D. R. Pearl and S. G. Best, for Fuel Control System for Turbine Engine, to which reference may be made for more detailed explanation and generally includes a fuel pump 38 for supplying fuel under pressure with a pressure actuated relief valve 40 for maintaining the pressure drop the same across the throttle valve 42. Valve 32 directs either the high or low pressure to the interior of bellows 44 to move valve 42 toward closed or opened position to thereby regulate the flow of fuel to the fuel jets 36. The movement of the valve toward closed position may be limited by a stop such as 43 to provide a minimum fuel flow.

The speed sensing circuit 14, which will be explained in more detail later, utilizes a bridge circuit to match a constant voltage selected by the pilot's lever 48 against the voltage of a speed signal generator 12, the resulting rectified signal is utilized to give a speed error signal which is applied to lines 50 and 52.

Power for operating the various electronic elements is normally provided by the generator 12 operating through a usual power supply 54, supplying among other voltages a minus 13 volt bias in line 56 and a plus 85 volt voltage-regulator-tube-controlled voltage in line 58. During the starting cycle, however, 400 cycle A. C. voltage from an outside source is supplied through the line 60 to the power supply. When a preselected speed is reached by the turbine and accordingly by the generator 12, the generator voltage acting through relay rectifier 62 and relay coil 64 will actuate switch arm 66 to disconnect the 400 cycle source and connect in the generator 12 to the power supply. A second switch arm 68 is actuated by the coil 64 at the same time in order to ground out line 70 to connect the swinger 166 of chopper 71 to ground and disable the starting circuit after a preselected speed is reached. Reference may be had to application Serial No. 282,204, filed by S. G. Best and T. P. Farkas, on April 15, 1952, for Starting Circuit for Electronic Jet Fuel Control for further details of the starting circuit. The thermocouple output amplifier and the main amplifier are, in effect, D. C. chopper amplifiers of a well known type.

The thermocouple input and chopper 74 balance the thermocouple signal against a datum which may be fixed or may be varied as desired.

The correction voltage or temperature error signal supplied by the thermocouple to the chopper contacts 76 and 78 is positive for an undertemperature condition and negative for an overtemperature condition. If a variable datum is used, a signal which is usually positive may be fed to the swinger 79 of chopper 74 to modify the amplitude of the square wave produced by the chopper 74. The swinger arm 82 of chopper 80 is mechanically synchronized with chopper arm 79 in such a way that positive signals at 76 and 78 will produce negative (i. e. undertemperature) voltage in the line 26 while negative voltages in the contacts 76 and 78 will produce positive (i. e. overtemperature) voltages in the line 26.

The convention observed with respect to the illustration of rectifiers herein is that current flow (from plus to minus) as distinct from electron flow is in the direction of the arrow.

The temperature error signal on line 26 is led through line 29 to resistors 130 and 132 to form a voltage divider circuit. A portion of the temperature error signal is led off through line 142 to the crossover limiter for switching purposes, which will be explained later. In the crossover limiter, rectifier 144 connects line 142 with ground and limits any negative temperature error voltage appearing on line 142 to a small amount, approximately one volt. A portion of the temperature error signal is led off from a point between resistors 130 and 132 through line 146 to contact 148 of the chopper 71 and is also led through line 150 into the crossover limiter from which it is selectively fed to the proportional solenoid in a manner to be described later.

The speed error signal is fed through line 52 to the contact 162 of chopper 71. This speed error signal is led on line 164 into the crossover limiter from which it is selectively fed to the proportional solenoid in a manner to be described later. The speed error signal, applied to line 50 from the speed sensing circuit, is fed into the crossover limiter for switching purposes which will be described later.

The speed and temperature error signals fed through lines 164 and 150 into the crossover limiter are led to rectifiers which will select one or the other as the signal to be transmitted, amplified and thence to the proportional solenoid. The speed error signal on line 164 is a square wave and is led to rectifiers 168 and 170 and the temperature error signal on line 150 is also a square wave and is led to rectifiers 172 and 174.

The speed error signal is also fed into the crossover limiter through line 50 and is led through resistors 188 and 200, the condensers in the lines serving as filters. The speed error voltage existing after passing through resistor 188 is applied at 202 between resistors 176 and 178 and at 204 between 184 and 186. This is a rectified D. C. error signal and is used to bias rectifiers 168, 170, 172 and 174. In the same manner the D. C. temperature error signal is led in on line 142 and after passing through resistor 206 is applied at 208 between resistors 180 and 182 which are connected to the rectifiers 168, 170, 172 and 174 to bias them. It will now be apparent that if the voltage in the speed error signal at 202 and 204 is more positive than the voltage in the temperature error signal at 208, rectifiers 168 and 170 will be biased to conduction and rectifiers 172 and 174 will be biased to non-conduction. Rectifiers 168 and 170 being conductive will pass the speed error square wave produced by chopper 71 and fed in line 164 to the crossover limiter.

Conversely, if the temperature error signal fed into junction 208 is more positive than the speed error signal fed into junctions 202 and 204, then rectifiers 172 and 174 will be biased to conduction and rectifiers 168 and 170 will be biased to non-conduction. The temperature error square wave fed in through line 150 will then be able to pass through rectifiers 172 and 174 to the proportional solenoid while the speed error signal becomes blocked. It is thus apparent that the most positive or the least negative error signal of the speed or temperature will select its corresponding square wave as the signal to be transmitted, amplified and fed to the proportional solenoid.

The network shown generally at 212 is fed from the minus 13 volt bias line of the power supply and is used to slightly bias rectifiers 168 and 170 to avoid the deadband common to all rectifiers. In a similar way the network shown generally at 214 is fed from the plus 85 volt section of the power supply to provide a bias for rectifiers 172 and 174 to avoid the deadband.

The speed and temperature error signals are arranged so that when fed to the crossover limiter an overspeed or overtemperature condition is indicated by a positive signal and conversely an undertemperature or underspeed signal is negative. In order to actuate the proportional solenoid 30 to close the throttle valve 42, it will therefore be necessary to feed a positive signal into the crossover limiter. This will call for less fuel in order to overcome an overspeed or overtemperature condition and thus close the valve. On the other hand, in order to actuate the proportional solenoid 30 so as to open the throttle valve 42, it will be necessary to feed two negative signals (i. e. both speed and temperature) into the crossover limiter. If one of the signals, say the speed signal, is zero, i. e. neither positive nor negative, and the other, temperature, is negative, the proportional solenoid will not be actuated and hence the throttle valve will not be changed. This is a condition which would exit if the generator should fail and the engine should arrive at an undertemperature condition. It would then be impossible to increase the fuel flow as the zero signal from the speed control would continue to govern. The invention of this application prevents such a condition from arising by providing mechanism which will automatically give an underspeed indication upon failure of the generator. As long as both signals are negative the proportional solenoid will be actuated to increase the fuel flow until one of them becomes zero or actually becomes positive and starts to reduce the fuel flow.

The speed sensing circuit utilizes a bridge having the inductance 220 and potentiometer 48 as one pair of legs and the resistor 222 and resistor 224 as the other pair of legs. The reactance of the inductance will vary directly with frequency and the bridge will therefore be in balance at only one speed. The alternating current at junction 226 of the bridge is led through a rectifier 228 and condenser 230 to ground and the alternating current at junction 232 of the bridge is led through rectifier 234 and condenser 236 to ground. The two rectifiers are connected to provide voltages of opposite polarity and are connected together by resistors 238 and 240 which may be of about 150K ohms each and resistors 242 and 244 may be of approximately 500K ohms each. The midpoint between resistors 238 and 240 is connected through approximately 5 megohms resistance in the feedback equalizer to line 52 and contact 162 of chopper 71. The midpoint between resistors 242 and 244 is connected to line 50 and the crossover circuit previously described. From the above it will be apparent that when the bridge is in balance, the voltages produced by rectifiers 228 and 234, are of opposite polarity, and current will flow through resistors 238 and 240 and 242, 244 but the voltage being of equal and opposite polarity at the opposite ends of these resistors and the resistors being equal, zero or no voltage will be produced at the midpoint of the resistors. As the bridge becomes unbalanced and one rectifier produces a greater or less voltage than the other, the midpoint of the resistance 238, 240 and 242, 244 will accordingly vary and give the necessary speed signal to change the amount of fuel delivered and thus change the speed so as to bring the bridge back into balance again. A temperature sensing resistor 246 having a negative temperature coefficient is placed in the turbine inlet to minimize the effect of air temperature changes on the operation of the jet engine and reduce its speed on a drop in temperature. The output of rectifier 228 is connected through resistor 248 to one side of resistor 246 and the output of rectifier 234 is connected through resistor 250 to the other side of resistor 246. A rectifier 252 is connected to ground between resistors 246 and 250. At a selected temperature and when the output of rectifiers 228, 234 is equal, this circuit has no effect because the sum of the resistances of 246 and 248 is equal to the resistance 250. In this circuit if a negative signal predominates, it will be limited by rectifier 252 to a small value so as to have substantially no effect. If a positive signal predominates, then a positive bias will be supplied to lines 50 and 52 through resistors 254 and 256 so as to call for a reduction in fuel and hence a reduction in speed. This positive signal in line 258 will be produced by a drop in temperature which will increase the resistance of resistor 246, thus unbalancing the 248, 246, 250 voltage divider circuit to give a positive voltage in line 258.

In the event of generator failure, no voltage will be supplied in lines 50 and 52 to the crossover limiter. This will prevent actuation of the proportional solenoid to increase fuel flow because the zero speed voltage will not move the proportional solenoid if it is accurately centered. If the engine is undertemperature, the negative temperature signal will not be effective to increase fuel flow as the zero signal from the speed circuit will predominate. If the engine is overtemperature, the proportional solenoid will be actuated to reduce fuel flow until a zero signal is received when no further change in fuel flow can take place. Hence upon failure of the generator, the engine would continue to run at whatever setting the engine failed. In practice the proportional solenoid is slightly biased so that under no signal conditions the throttle valve will creep toward minimum fuel position. Hence instead of continuing to run at a fixed setting the engine, in practice will gradually creep to the idle or minimum fuel position. In order to permit operation of the engine at full power upon generator failure, I have provided a safety circuit to supply a negative or underspeed signal to the speed circuit upon failure of the generator so that control will be transferred to the thermocouple and the engine will continue to run at the maximum permissible temperature. With this device there are two choices upon failure of the generator, the engine can either be run at the maximum permissible temperature with the speed settling out at some balancing speed or the engine can be shut down. In order to provide the negative signal, I connect the minus 13 volts of the power supply through resistor 260 and rectifier 262 at junction 264 with the output of rectifier 228. In normal operation, the rectifier 228 supplies a negative voltage varying between minus 15 and minus 30 at the junction 264 dependent upon the setting of rheostat 48. As long as the generator is operating and as long as the voltage at junction 264 is greater than the minus 13 volts being supplied through line 266 and resistor 260 to the rectifier 262, rectifier 262 will be biased to non-conduction and the minus 13 volts will have no effect on the speed circuit. If, however, the generator is disabled, then rectifier 228 will not provide any negative voltage and rectifier 262 will then be biased to conduction and will provide a negative bias in lines 50 and 52. The negative voltage supplied at point 264 when the generator is not operating is limited by resistances 248 and 246 which are connected to ground through rectifier 252 of the temperature compensating circuit which may be in the nature of 400K ohms when the resistor 260 is 1 megohm. The other main path to ground from the minus 13 volts would be through resistor 242 and resistor 200 in the crossover circuit to ground which would give a total resistance of approximately 700K ohms. These resistances are large enough so that they, together with resistance 260, act as a voltage divider to give a substantial portion of the minus 13 volts at junction 264 and hence on lines 50 and 52. This safety circuit will operate with either the resistance 260 alone or the rectifier 262 alone. If the resistance 260 is omitted, then the full minus 13 volts subject only to the drop through the rectifier 262 will be applied at junction 264 when the generator is not operating and, as explained above, none of the minus 13 volts will appear at the junction 264 when the generator is operating.

If the rectifier 262 is omitted and only resistance 260 is utilized, then as explained above a substantial portion of the minus 13 volts will appear at junction 264 when the generator is not operating. When the generator is operating, rectifier 228 is biased to conduction during a portion of each cycle and effectively acts as a low resistance path for the minus 13 volts applied through line 266. Actually the voltage at 264 produced by the rectifier 228 having a larger negative value than the negative voltage supplied in line 266 will tend to be reduced but as the resistance of the potentiometer 48 is only in the nature of 8K ohms and the rectifier is biased to conduction and hence would have very little resistance, the major voltage drop will appear across the resistor 260 and the minus 13 volts will have very little effect on the voltage at junction 264. It is thus apparent that the minus 13 volts applied in line 266 has little or no effect on the generator signal when the generator is operating but supplies a substantial negative signal upon generator failure and thus prevents the negative voltage at junction 264 from dropping below a predetermined amount.

Generator failure will cause switches 66 and 68 to be opened so as to disconnect swinger arm 166 from ground and to connect the 400 cycle A. C. power source to the power supply to replace the lost generator supply. When the swinger arm 166 is disconnected from ground by switch 68, it finds a ground connection through resistor 267 in the starting circuit which is more fully described in application Serial No. 282,204 referred to above. Briefly a positive voltage of about 85 volts is supplied through line 268 through resistor 270 and rectifiers 272 to junction 294. This voltage finds a path to ground through resistor 276, line 278 and rectifier 280. This circuit will supply a higher positive voltage at 294 than the negative voltage being supplied from line 29 through resistor 282 so as to completely neutralize the negative voltage from the thermocouple output and thus prevent a negative voltage from being supplied to the swinger arm 166. Grounding through resistance 267 will reduce the amplitude of the square wave produced by the chopper 71 only slightly and will not act to change its polarity. From the above description it will be apparent that I have provided a safety circuit comprising resistors 260 and rectifier 262 connected with a source of negative voltage which will have little or no effect upon the speed control when the generator is operating but will provide a negative (i. e. underspeed) signal when the generator is not operating so that control may be by temperature alone.

If potentiometer 48 should fail, by opening, the voltage at 226 would greatly increase which would provide a large negative (i. e. underspeed) signal in lines 50 and 52. This signal would be of such a large magnitude that it would feed backwards through rectifier 168 and supply a negative voltage to the proportional solenoid which would have to be overcome by an equal positive voltage out of the thermocouple amplifier in order to produce a null signal at the proportional solenoid. This positive (i. e. overtemperature) signal from the thermocouple could be produced only by an overtemperature and probably dangerous condition. In order to prevent the large underspeed signal from reaching the crossover circuits, rectifiers 284 and 286 are provided to limit the negative voltage which can be attained in either line 50 or 52. Hence no excessive underspeed signal can be supplied to the crossover limiter.

Although the circuit including the speed sensing and safety circuit has been described in detail and only a single embodiment has been used as an example in the description, it will be apparent that many modifications may be made which will come within the scope of the invention. Therefore, I do not desire to be limited by the details of the embodiment which has been selected for the purpose of explaining the invention. For example, while particular polarities have been chosen and used in the embodiment described, it is apparent that the several polarities may be reversed without affecting the result.

What it is desired to secure by Letters Patent is:

1. In combination, a generator, means, including a rectifier, producing a first signal of one polarity from the generator output which may be combined with a signal of opposite polarity to provide a speed error signal of the null signal type, a source of voltage of said one polarity less than the voltage of said first signal, an impedance forming a voltage divider with said rectifier and connecting said source and the output of said rectifier, said rectifier providing an effective low impedance portion of said voltage divider when conducting and a larger impedance portion when non-conducting.

2. A device as in claim 1 in which the connecting impedance consists of a resistance.

3. A device as in claim 1 in which the connecting impedance consists of a rectifier.

4. A device as in claim 1 in which the connecting impedance comprises a resistance and a rectifier.

5. In combination, a generator, electrical circuit means providing a speed error signal of the null signal type from the generator output having a speed error signal of one polarity for underspeed and the opposite polarity for overspeed, a source of voltage of the underspeed polarity, an impedance, forming a voltage divider with said circuit means, connecting said source and said generator output, said circuit means providing an impedance of relatively low value when the generator is operating and providing an appreciably larger impedance when disabled.

6. In combination, an alternating current generator, a bridge circuit, having a reactance in one leg, connected to the generator output to provide voltage variations at the bridge junctions which will vary in accordance with generator speed, rectifiers connected to the bridge junctions to provide direct current voltages of opposite polarities, resistances connecting said rectifiers to provide a signal of one polarity when underspeed, a null signal when onspeed and a signal of the opposite polarity when overspeed, circuit means connected with said rectifiers for utilizing and compensating said signals, a source of voltage of underspeed polarity, an impedance connecting said source with the rectifier providing the underspeed polarity, said impedance forming a voltage divider with the impedance of said bridge and circuit means, the impedance of said bridge and circuit means being materially smaller than said connecting impedance when the generator is operating and increasing materially when the generator is disabled whereby said source will have an immaterial effect on said signals when the generator is operating but will itself provide an underspeed signal when the generator is disabled.

7. A device as in claim 6 in which the connecting impedance consists of a resistance.

8. A device as in claim 6 in which the connecting impedance consists of a rectifier.

9. A device as in claim 6 in which the connecting impedance comprises a resistance and a rectifier.

10. In a speed responsive fuel control device for an engine, means for generating both a voltage varying with speed and a substantially constant voltage, means for comparing said two voltages to establish a speed error signal, a substantially constant voltage source, a connection connecting said voltage source with said first mentioned constant voltage including means for preventing the constant voltage supplied to said connection from dropping below a predetermined amount upon malfunctioning of said means for generating a substantially constant voltage.

11. In a fuel control system for an engine, fuel regulating mechanism, a generator driven in timed relation with said engine, an output circuit connected with said generator for producing a first electrical signal of the null signal type varying in accordance with engine speed, means for producing a second electrical signal of the null signal type varying in accordance with another engine parameter, means comparing said signals and selecting the algebraically predominant signal for the fuel controlling signal, means connecting said signal comparing means with said fuel regulating mechanism for increasing or decreasing fuel in accordance with the polarity of said selected signal, safety means for automatically supplying a signal upon failure of said generator comprising an electrical signal source of fuel increasing polarity, an impedance continuously connecting said source with said generator output circuit, said output circuit having a greater effective source impedance when the generator is not operating than when the generator is operating, said operating impedance being materially smaller than said connecting impedance.

12. In a device having a generator circuit providing a null signal when at a preselected speed and a voltage of one polarity when overspeed and of the opposite polarity when underspeed, comprising a first means in said circuit providing a voltage of one polarity and a second means in said circuit providing a voltage of an equal and opposite polarity when onspeed, and a pair of resistors in series connecting said first and second means to provide a null voltage between them, a separate source of voltage of said opposite polarity, a connecting impedance connecting said source with said second means, said second means providing a path of lower effective impedance to said source than said connecting impedance when the generator is operating and providing a path of materially higher impedance when the generator is not operating.

13. A device as in claim 5 in which the connecting impedance includes means for materially decreasing the impedance to said source when said generator is not operating.

14. A device as in claim 5 in which the connecting impedance has a relatively high value when the generator is operating and a materially lower value when the generator is not operating whereby the voltage from said source will have substantially no effect on the speed error signal when the generator is operating but will provide a substantial underspeed signal when the generator is not operating.

15. In a fuel control system for an engine, fuel regulating mechanism, a generator driven in timed relation with said engine, an output circuit connected with said generator for producing a first electrical signal of the null signal type varying in accordance with engine speed, means for producing a second electrical signal of the null signal type varying in accordance with another engine parameter, means comparing said signals and selecting the algebraically predominant signal for the fuel controlling signal, means connecting said signal comparing means with said fuel regulating mechanism for increasing or decreasing fuel in accordance with the polarity of said selected signal, safety means for automatically supplying a signal upon failure of said generator comprising an electrical signal source of fuel increasing polarity, and means automatically substituting a signal from said electrical signal source for said first electrical signal upon failure of said first electrical signal with failure of said generator whereby said fuel will be increased until controlled by said second electrical signal.

16. A fuel regulating mechanism as claimed in claim 15 in which the signal from said electrical signal source is a fuel increasing signal of substantially fixed value and in which the fuel will be continuously increased by said substituted fuel increasing signal until controlled by said second electrical signal.

17. A fuel regulating mechanism as claimed in claim 15 in which said another engine parameter is temperature which tends to increase with increasing fuel supply.

18. In a speed responsive fuel control device for an engine, means for producing a D. C. voltage varying with speed, means for producing a substantially constant D. C. voltage, means for comparing said two D. C. voltages to establish a speed error signal, a substantially constant D. C. voltage source of lower potential than said substantially constant D. C. voltage, a connection connecting said D. C. voltage source with said first-mentioned constant D. C. voltage and means normally isolating said source from said connection but preventing the constant D. C. voltage at said connection from dropping below a predetermined amount upon malfunctioning of said means for producing a substantially constant voltage.

References Cited in the file of this patent
UNITED STATES PATENTS

| | | |
|---|---|---|
| 2,349,685 | Trucksess | May 23, 1944 |
| 2,502,729 | Klimkhamer | Apr. 24, 1950 |
| 2,542,499 | Fortescue | Feb. 20, 1951 |
| 2,600,172 | John | June 10, 1952 |
| 2,615,066 | Milne | Oct. 21, 1952 |
| 2,623,354 | Best | Dec. 30, 1952 |
| 2,632,996 | Rood | Mar. 31, 1953 |
| 2,662,372 | Offner | Dec. 15, 1953 |